Figure 6:
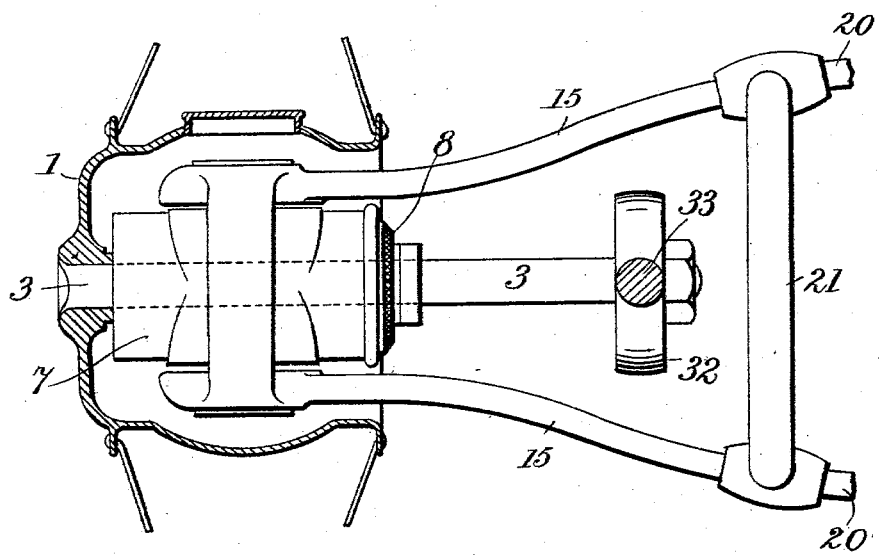

No. 746,834. PATENTED DEC. 15, 1903.
E. G. HOFFMANN.
MOTOR VEHICLE.
APPLICATION FILED JULY 9, 1901.
NO MODEL. 3 SHEETS—SHEET 1.
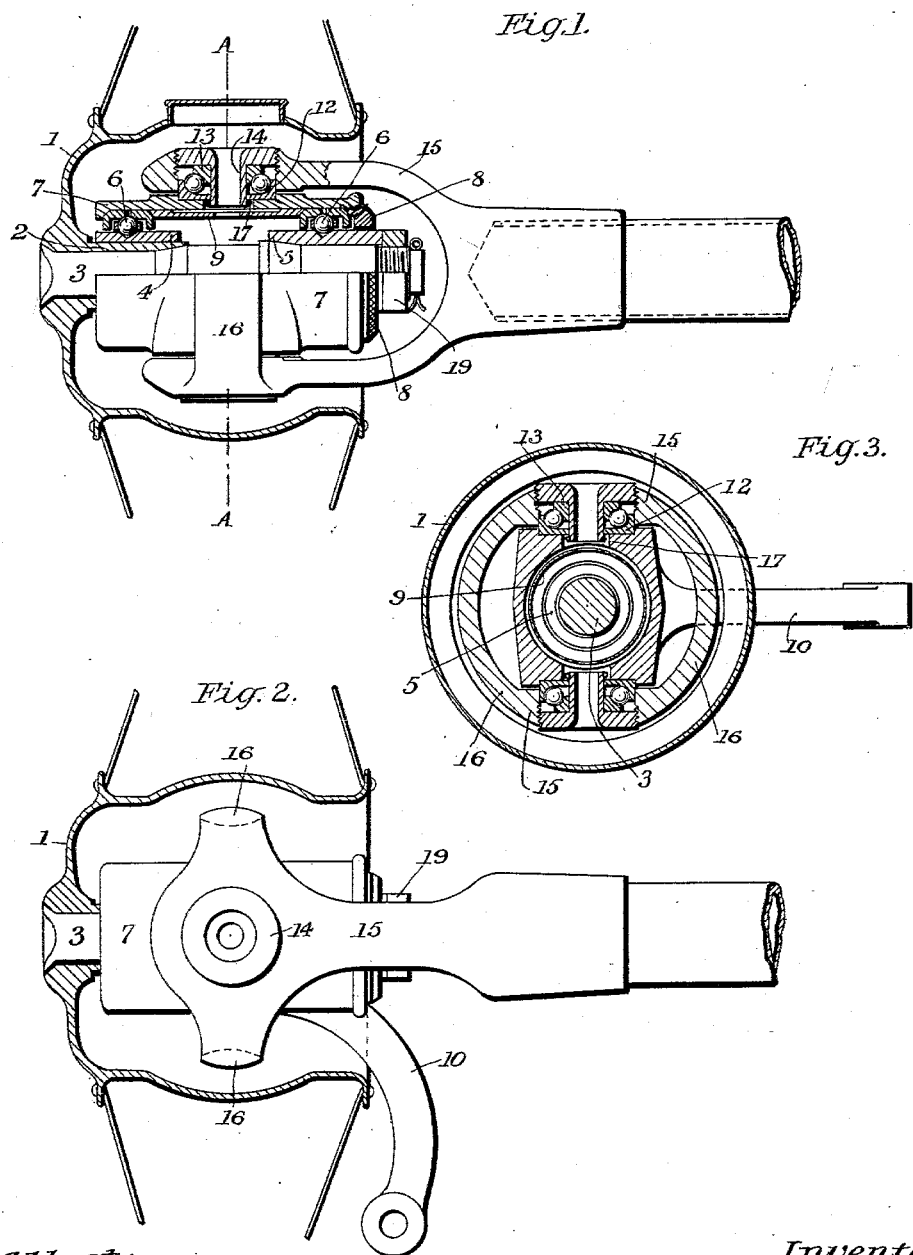

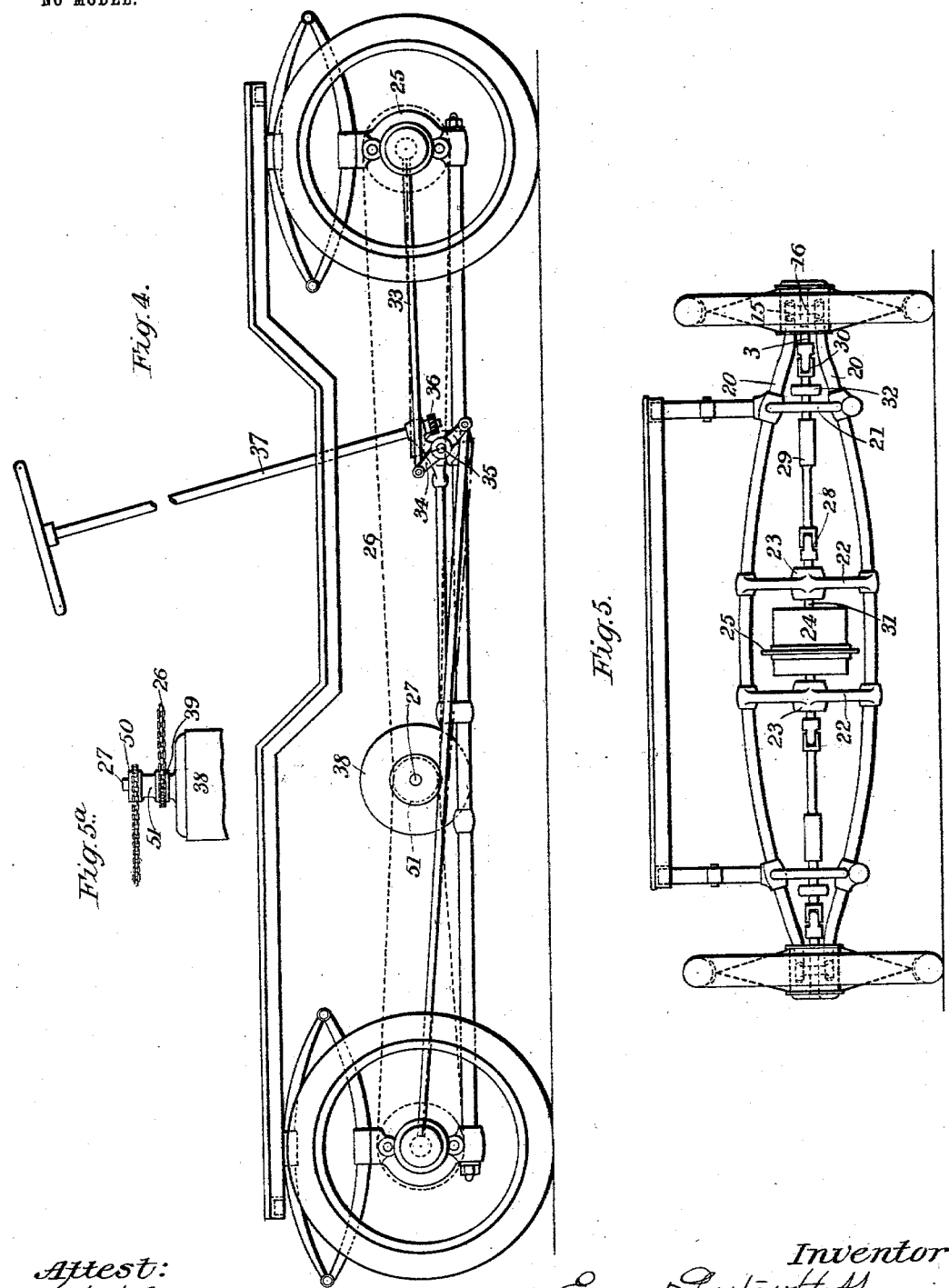

No. 746,834. PATENTED DEC. 15, 1903.
E. G. HOFFMANN.
MOTOR VEHICLE.
APPLICATION FILED JULY 9, 1901.
NO MODEL. 3 SHEETS—SHEET 3.

WITNESSES
INVENTOR
Ernest Gustav Hoffmann

No. 746,834. Patented December 15, 1903.

UNITED STATES PATENT OFFICE.

ERNST GUSTAV HOFFMANN, OF CHELMSFORD, ENGLAND.

MOTOR-VEHICLE.

SPECIFICATION forming part of Letters Patent No. 746,834, dated December 15, 1903.

Application filed July 9, 1901. Serial No. 67,585. (No model.)

*To all whom it may concern:*

Be it known that I, ERNST GUSTAV HOFFMANN, a subject of the German Emperor, residing at Chelmsford, in the county of Essex, England, have made a certain new and useful Improvement in Motor Road-Vehicles, of which the following is a specification.

My invention relates to improvements connected with the steering and driving of motor road-vehicles; and it consists of a construction of hub and axle and arrangement of parts connected therewith whereby the wheel may be turned for steering purposes on a vertical line, as has been before proposed, or whereby it may be driven alone or both steered and driven, the invention including other details connected with the arrangement of such parts in a vehicle, as will be hereinafter described.

I have illustrated my invention in the accompanying drawings, in which—

Figure 1 is an elevation of a hub and axle, part being in section. Fig. 2 is a plan of Fig. 1, part being in section. Fig. 3 is a section of Fig. 1 on line A A. Fig. 4 is a side elevation of a car-base having my improvement applied thereto. Fig. 5 is an end elevation of Fig. 4. Fig. 5ª is plan showing part of the car-motor and driving-chains. Fig. 6 is a detail view, partly in section, showing a wheel-hub and its connection with the axle and the steering attachment.

According to my invention, as shown in Figs. 1 to 3, I form the wheel-hub 1 open at one end and closed at the other, the latter having an inwardly-projecting sleeve 2, in which is rigidly secured a short axle 3, the sleeve affording a good support for the axle, or the axle can be otherwise affixed to the hub. Upon the sleeve at one end and the axle at the other are carried loose sleeves 4 5, provided with races for ball-bearings 6 6, preferably of the four-point type shown, which are held in a casing 7 and are adjustable therein by a suitable lock-nut 8, the bearings being separated and kept apart by a sleeve 9. The casing in this form carries an arm 10, which can be connected to the steering mechanism, and such casing is adapted to swivel in the vertical axial line of the wheel on a ball-bearing support, which consists of the cup portion 12 of the bearing sunk in a recess in the casing 7, the balls, and a further cup portion 13, (or a cone portion,) which are held in place by a locking-nut 14, having a downward projection, preferably tubular, as shown, said nut 14 being carried in one of the arms of a yoke 15 or by separate arms, which may be attached to the vehicle-frame or to a fixed axle-bar, as shown. The other arm of the yoke carries a similar swiveling bearing, and the two arms are connected by strap-pieces 16 16, which are preferably semicircular, so as to allow the casing room to swing. These connecting-straps allow of utilizing ball-bearings which are adjusted by longitudinal pressure, which will be taken up by such straps and also allow of the load being carried by both arms of the yoke instead of otherwise by the upper arm only. The tubular parts of the nuts 14 are provided with a small spring-wire ring 17 engaging with a groove in their lower ends, so that when the nuts are removed the whole of the bearing may be lifted with them, and hence the wheel and casing be withdrawn, or to allow of the wheel and axle only being withdrawn the end of axle 3 is provided with a nut 19, which abuts against the sleeve 5 and which when removed will allow the wheel and axle to be withdrawn, leaving all the bearings in place.

By the construction of hub the bearings are both small and easily accessible.

In place of steering by an arm attached to the casing 7 and securing the axle in such casing I may apply a portion of my invention described above to the arrangement illustrated in Figs. 4 to 5, in which I both steer and drive from the axle 3 and in which the yoke 15, Fig. 5, which in this case is formed of separate arms also connected by the strap 16, is attached to the ends of the curved tubes 20 20, forming part of the tubular frame of a car, and which tubes are connected at suitable places by rings 21 and center stays 22 22, the latter acting as supports for the axle-bearings 23 23. Between these bearings is mounted any suitable differential gear or like device in a casing 24, driven by sprocket-and-chain gearing 25 26 from a motor-shaft 27, so that both axles may be driven. Connected to the axle 31, passing through these bearings 23, is a universal swivel 28 of some suitable form, a telescoping device 29, and a second universal swivel 30, which is connected to the short axle 3, which has been extended for this purpose through the hub, as shown in Fig. 5. Also carried by the axle is a swiveling collar 32, preferably containing a ball-bearing and which is connected to a steering-rod 33. This rod, it will be evident, may be operated in any suitable way by which a reciprocating movement may be given to it. As shown, it is connected to one end of a lever 34, centrally pivoted on a shaft 35, forming a part of the frame, the other end controlling a similar rod running in the other direction to the rear wheels, the arrangement of which is identical with that previously described, as is also the arrangement of parts for the wheels on the opposite side of the car and none of which are therefore separately described.

The shaft 35 may carry a worm-wheel which is moved by a worm 36 on the steering-rod 37.

In the case of steering alone and where the driving question does not come in, as shown in Fig. 6, the steering-rod 33, with its swiveling collar 32, may be mounted directly on the short axle 3, and the universal joints and telescoping arrangements necessary for the driving would not be required.

The motor 38 in the arrangement illustrated drives the chain 26 running forwardly by a sprocket-wheel 39, Fig. 5ª, and the chain running rearwardly by a sprocket-wheel 50 through a suitable differential gearing or a like device in a casing 51, so as to differentiate between the front and rear pair of wheels. As will be seen by this arrangement, the torque or gripping power of all four wheels in this arrangement is absolutely alike, and therefore the load may be distributed evenly on all four wheels and not as is now customary on only two driving-wheels, so that the strain is spread over the four wheels both in the straight and around curves.

The steering-levers 33 are in practice set so as to cause each wheel to move in the correct arc while all the wheels are running round a common center, as is now well understood. As in the present case, all four wheels being steered, it is evident that a much lesser arc for each wheel to swivel in is necessary than if two wheels only are steered, and it is therefore evident that by taking hold of the wheel for steering purposes on its actual axle it forms a very suitable point from which to steer the wheel on account of its directness and rigidity.

It is obvious that an arrangement may be employed whereby the back wheels are both steered and driven as described, while the front wheels are steered alone, or vice versa, without any change in the mechanism except the leaving out of the front or rear part of the driving mechanism, and it will also be understood that the weeels may be driven alone without steering, which latter in a vehicle would then be done by a separate wheel or wheels.

What I claim is—

1. The combination with a wheel-hub, of arms projecting into same, a bearing swiveling in said arms and straps outside of said bearing connecting the bearing ends of such arms.

2. The combination with a hub having a closed and an open end, of an axle projecting inwardly from the closed end, a bearing for such axle, arms for carrying such bearing and means for connecting such arms at their ends outside of said bearing to prevent expansion of same and means such as a vehicle-frame for supporting said arms so that the casing, bearings, and axle may swivel therein.

3. In combination, a hub having a closed and an open end, an axle projecting inwardly from the closed end, sleeves on such axle, ball-bearings outside such sleeves and of which they form part, means for adjusting the ball-bearings, a casing for holding such bearings, means for holding the axle end against one of such sleeves upon the release of which the axle may be removed without disturbing the ball-bearings, and arms in which such casing can swivel.

4. The combination with a vehicle-wheel, having a hub, a rotatable axle rigidly secured to the hub, a bearing surrounding such axle and through which such axle projects, and means for pivotally holding said bearing, of means for steering the wheel directly from the projecting end of the rigid rotatable axle.

5. The combination with a hub having a rigid axle secured thereto, a bearing for holding such axle, arms in which such bearing is pivotally held, straps connecting such arms outside of said bearing, and means for steering such wheel directly from said rigid axle.

6. The combination with a hub having a rigid axle secured thereto and means for pivotally holding such axle of means for both driving and steering such wheel directly from such rigid axle.

7. The combination with a hub having a rigid axle secured thereto, and means inside said hub for pivotally holding such axle, of means for driving such wheel directly from such rigid axle.

In testimony whereof I have hereunto set my hand in the presence of two subscribing witnesses.

ERNST GUSTAV HOFFMANN.

Witnesses:
G. F. BANETT,
ALLEN PARRY JONES.